United States Patent Office 3,311,697
Patented Mar. 28, 1967

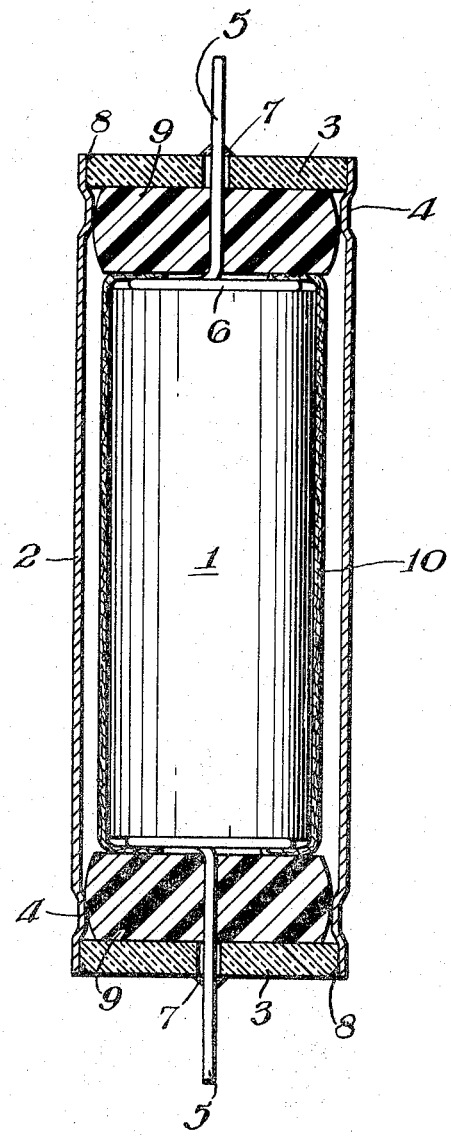

3,311,697
CAPACITOR UNIT
James Quinn, Whiteburn, West Lothian, Scotland, assignor to Sprague Electric Company, North Adams, Mass., a corporation of Massachusetts
Filed Aug. 10, 1965, Ser. No. 478,628
Claims priority, application Great Britain, Aug. 19, 1964, 33,888/64
6 Claims. (Cl. 174—52)

The invention relates to capacitor units, and in particular to capacitor units in which a capacitive element is located within a protective housing.

It is not normally possible to manufacture the capacitive elements for capacitor units with precisely consistent dimensions. The housings or casings of prior art capacitor units are therefore made large enough readily to contain capacitive elements of the greatest size that might be encountered. The use of housings in which the capacitive elements will fit very loosely also facilitates the step of inserting the elements. The elements are supported by means of lead-wires which extend from the electrodes of the element to outside the unit and are sealed through apertures in the housing wall.

Prior art capacitor units of the foregoing construction are satisfactory in static locations, but difficulty arises when they are subjected to bumps or vibrations. Any movement of the capacitive element relative to the housing of the capacitor unit, due for example to a sharp deceleration, imposes a mechanical stress on the lead-wires which might be sufficient to destroy the seal through the housing wall, or even break the lead-wire or its connection to the element. There is consequently a demand for capacitors which will show no defects when subjected to sustained vibration and sudden acceleration.

It is an object of this invention to overcome the foregoing and related disadvantages of the prior art capacitor constructions.

Another object of the invention is to provide means for securing a capacitive element firmly within a protective housing.

Another object is the provision of means for vibration-free mounting of a capacitive element within a protective housing regardless of the relative diameters of the element and the housing.

These and other objects of this invention will become more apparent upon consideration of the following description and accompanying drawing in which:

The sole figure is an axial cross-section of a capacitor constructed in accordance with this invention.

In general, the objects of this invention are attained by a capacitor unit having a generally cylindrical capacitive element within a tubular housing, the element being restrained against axial movement relative to the housing by a resilient member between one end of the element and the adjacent end wall of the housing.

The capacitor unit illustrated comprises a wound capacitive element 1 of generally cylindrical form, the inner construction of which is not shown inasmuch as it forms no part of the invention. The element 1 is located within a tubular metal housing 2; the sealing and terminal arrangements at the two ends of the housing 2 are alike and only one will be described.

A ceramic end disc 3 is supported at the rim of its inner face on a step formed in housing 2 by an internally projecting beading 4. The disc 3 has a central aperture through which projects a lead-wire 5 enabling electrical connection to be made from outside the capacitor unit to an electrode of capacitive element 1. The inner end 6 of lead-wire 5 is in the form of a spiral applied on the end surface of element 1. The outer face of disc 3 is metallized over a small central area to which leadwire 5 is soldered, as at 7, and metallized over a separate peripheral area which is soldered to the metal housing 2, as at 8; these soldered connections ensure a hermetic seal at the ends of the unit.

A resilient washer 9, is clamped between the inner surface of disc 3 and the corresponding end surface of element 1. The element 1 is surrounded by an outer wrapping 10 of insulating material, for example paper, the ends of which project axially beyond the element and are folded in between the wire spiral 6 and the washer 9. The axial thickness of the washer 9 is such that element 1 is firmly clamped under the pressure of end discs 3, and axial movement of element 1 relative to housing 2 is prevented. The frictional engagement of the end surfaces of element 1 and housing 2 by the washer 9 is sufficient to prevent also lateral relative movement under any acceleration or vibration likely to be encountered.

The diameter of washer 9 is rather less in the uncompressed condition than the inner diameter of beading 4, but can be such that under compression the washer expands radially to engage the inner surface of the beading. The element 1 is thereby additionally secured against movement relative to the housing 2.

A suitable material for washer 9 is synthetic rubber which is not attacked by the materal commonly used to impregnate capacitive elements, and which molds itself under pressure to the irregular end face of element 1 constituted in part by the wire spiral 6, so that a large area of engagement results. The washer 9 could however be made of foamed plastics material, for example polyurethane foam, in such a size and shape that the ends of the element are actually embedded. The peripheral portion of the inner face of washer 9 will thus be deformed to extend some distance axially of the unit, between the side walls of the element 1 and the housing 2. In this way, relative radial movement of element 1 and housing 2 is restrained.

The capacitor unit described can be assembled by first placing the element 1 in the open-ended housing 2 with the lead-wires 5 projecting axially therefrom. The resilient washers 9 are then slipped onto the lead-wires 5. The washers 9 can instead however be placed on the lead-wires 5 before insertion, because their uncompressed diameter is such that they can pass the beadings 4. At least one of the closure discs 3 must of course be put on its lead-wire subsequently to insertion, as the discs 3 are of greater diameter than the beadings 4. With the washers 9 and the discs 3 on the lead-wires 5, the discs are pressed so as to slide along the wires into place against the steps formed by the beadings 4 and soldered at their edges to the housing 2. The lead-wires 5 can be soldered to the central metallized areas of the discs 3 at this time too. The pressure required to push the discs 3 into place compresses the washers 9, thereby clamping the element 1 into place.

Instead of a housing with two open ends, a can having an integral closed end could be used with both lead-wires extending at the other end through a resilient washer and a closure disc as described. With either form of housing only a single resilient washer could be employed, the opposite end of the element engaging the inner face of the adjacent closure disc or housing end wall directly or through non-resilient means. Moreover, either form of housing could have in place of the ceramic disc a composite disc comprising Bakelite and rubber layers laminated together. The metal tube end could be conveniently spun over onto the outer rubber layer of such a composite disc to hold it in position.

It will be evident that the invention provides a simple and effective means of securing a capacitive element against undesired movement relative to its housing, which can be readily applied to a wide variety of constructions.

What is claimed is:

1. A capacitor unit having a generally cylindrical capacitive element within a tubular housing, said element being of smaller diameter and shorter than said housing, said element being restrained against axial and lateral movement relative to said housing by a compressed resilient member between each end of said element and the adjacent rigid end closure of said housing, each resilient member having a generally disc-like form, and a lead-wire of said element extending through an aperture in each resilient member.

2. A capacitor unit as claimed in claim 1 in which said resilient member has, between faces engaging said element and said housing end wall, at least one portion engaging the side wall of said housing.

3. A capacitor unit as claimed in claim 1 in which the material of said resilient member is synthetic rubber.

4. A capacitor unit as claimed in claim 1 in which the material of said resilient member is of sufficient flexibilty for the end of said element to be embedded therein, said member having a portion extending between the side walls of said element and said housing.

5. A capacitor unit as claimed in claim 4 in which the material of said resilient member is a foamed plastic material.

6. A capacitor unit as claimed in claim 5 in which the material of said resilient member is a polyurethane foam.

References Cited by the Examiner

UNITED STATES PATENTS

| | | | |
|---|---|---|---|
| 3,124,727 | 3/1964 | Murray | 174—52.5 |
| 3,159,776 | 12/1964 | Metcalf | 317—242 |
| 3,182,238 | 5/1965 | Toder | 174—52.5 |

FOREIGN PATENTS

| | | |
|---|---|---|
| 586,682 | 3/1947 | Great Britain. |
| 793,380 | 4/1958 | Great Britain. |

LEWIS H. MYERS, *Primary Examiner.*

E. GOLDBERG, *Assistant Examiner.*